United States Patent

[11] 3,628,218

[72] Inventors Knud Simonsen;
Soren Sondergaard, both of Islington, Ontario; Erik Norgaard Eriksen, Malton, Ontario, all of Canada
[21] Appl. No. 878,351
[22] Filed Nov. 20, 1969
[45] Patented Dec. 21, 1971
[73] Assignee Knud Simonsen Industries Ltd.

[54] CARCASS PROCESSING MACHINE
9 Claims, 4 Drawing Figs.

[52] U.S. Cl..................................................... 17/1, 17/17
[51] Int. Cl...................................................... A22b 5/08
[50] Field of Search............................................ 17/1, 1 D, 1 DA, 17, 20, 11.1 A

[56] References Cited
UNITED STATES PATENTS
2,748,421 6/1956 Hedstrom..................... 17/1 R
2,994,908 8/1961 Fill.............................. 17/1 R
3,397,423 8/1968 Burch........................... 17/20

Primary Examiner—Lucie H. Laudenslager
Attorney—George A. Rolston

ABSTRACT: A machine for effecting a processing treatment such as a cleaning operation on each of a series of animal carcasses sequentially fed to an operating station at which such a machine is disposed comprises a carcass-treating unit and a positioning means for moving the carcass-treating unit towards and away from each animal carcass disposed at the operating station in response to dimensional characteristics of each said carcass. The machine which is especially suited for cleaning hog heads after singeing depilation usefully includes a pneumatic means containing a volume of air which is compressed to an extent dependent on the reactive force exerted by each animal carcass on the carcass-treating unit of the machine so as to permit the desired variable movement of the carcass-treating unit of that machine away from each such animal carcass.

Inventors
KNUD SIMONSEN
SOREN SONDERGAARD
ERIK NORGAARD ERIKSEN
by: *George A. Rolston*

CARCASS PROCESSING MACHINE

BACKGROUND OF THE INVENTION

The present invention relates to machines for effecting processing treatments on each of a series of animal carcasses sequentially fed to an operating station at which such a machine is disposed. The machines of the present invention are especially suited for use in cleaning hogs' heads, for example, after depilation thereof by a singeing treatment.

In the use of such a carcass-cleaning machine, the individual hog carcasses are generally fed suspended from an overhead conveyor to an operating station at which rotary brushes are disposed for brushing engagement sequentially with each hog head for removing burnt bristles, dried blood and other surface dirt therefrom. A problem arises with existing machines used for this purpose in that the reactive force exerted by each such hog head on the rotating brushes varies considerably depending on the size of the particular hog carcass being processed. For example, the lengths of the hog carcasses will vary as will their thicknesses. Such dimensional differences cause variations in the force exerted on the brushes of the machine by the carcasses and this can easily lead to damage to the machine from overloading of its power source, for example, an electric motor, as well as to inefficient and even ineffective cleaning of the animal carcass.

Accordingly, it is a principal object of the present invention to provide a machine for effecting a processing treatment, such as cleaning treatment, on each of a series of animal carcasses sequentially fed to an operating station and particularly for cleaning hogs' heads so fed to an operating station, which machine includes means for accommodating variations in the size of the individual animal carcasses.

It is another object of the present invention to provide a machine of the aforementioned type in which machine a positioning means is provided for manually and automatically adjusting the position of a carcass-treating unit in response to the size of each carcass being processed.

Another object of the present invention is to provide a machine of the aforementioned type which machine is characterized by its simple and reliable construction and operation.

SUMMARY OF THE INVENTION

In its broadest scope, a machine in accordance with this invention for effecting a processing treatment on each of a series of animal carcasses sequentially fed to an operating station comprises a carcass-treating unit movably mounted at said operating station and adapted sequentially to engage thereat each of said animal carcasses for effecting a processing treatment sequentially thereon and to be urged away from each said animal carcass disposed at said operating station in a first direction with a force responsive to dimensional characteristics of each said animal carcass, and a positioning means operatively associated with said carcass-treating unit and adapted to urge said carcass-treating unit to move in a second direction opposite to said first direction and to maintain said carcass-treating unit in processing engagement with each said animal carcass at said operating station.

In accordance with a particularly useful feature of the present invention, the carcass-treating unit of a machine in accordance therewith is mounted for guided movement in the aforementioned first and second directions along a guideway. The carcass-treating unit of a machine in accordance with the invention is usefully connected to the positioning means of the machine by a flexible linkage so as substantially to reduce the transmission of operating stresses from such carcass-treating unit of the machine to its positioning means to provide greater operational reliability.

The positioning means provided in a carcass-treating machine in accordance with this invention is usefully pneumatically operated and can, for example, include an air chamber containing a body of air which is compressed or which expands in response to engagement of the carcass-treating unit with animal carcasses of different sizes to allow the required and automatic adjustment of the position of that carcass-treating unit with respect to each animal carcass in engagement therewith.

As will be explained hereinafter in greater detail with reference to the particular embodiment of a machine in accordance with the invention as shown in the accompanying drawings, such a pneumatically operated machine is usefully provided with an air relief valve to permit the escape of air from within its air chamber in the event that the compression of that air exceeds a predetermined value. With such provision of an air relief valve, a processing machine in accordance with the invention can operate effectively on animal carcasses having larger size variations. When an air relief valve is provided in the manner described, an air supply line will be provided for the unidirectional flow of pressurized air into the air chamber of the positioning means when the air pressure within the air chamber falls below a predetermined value.

Other objects, features and advantages of the invention will become apparent as the description herein proceeds.

BRIEF DESCRIPTION OF THE DRAWINGS

The invention will now be described merely by way of illustration with reference to the accompanying drawings in which.

DESCRIPTION OF THE PREFERRED EMBODIMENT

Figure 1:
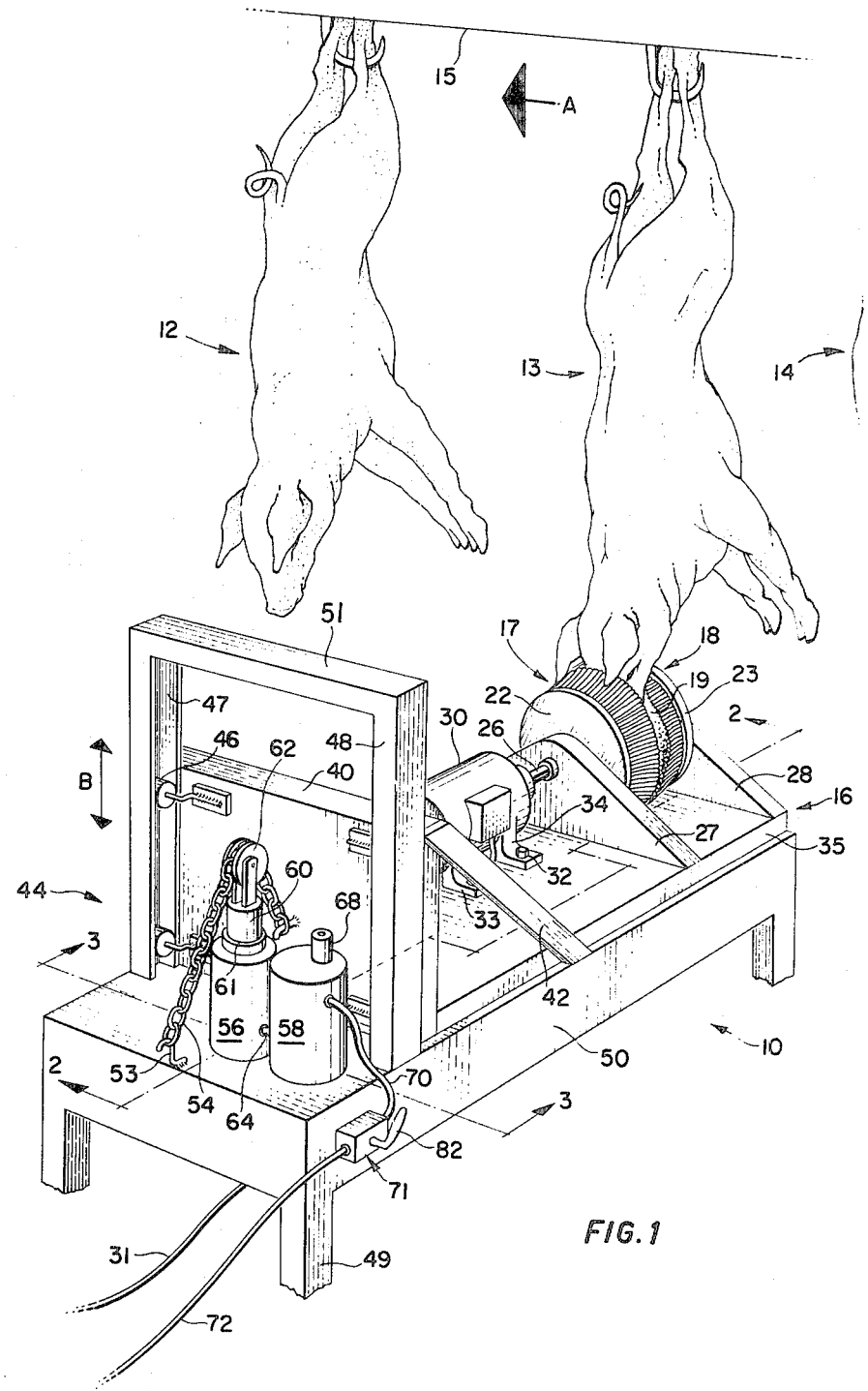
FIG. 1 is a somewhat simplified perspective view of a particularly useful embodiment of a carcass-processing machine in accordance with the present invention and intended particularly for effecting a cleaning operation sequentially on the heads of a series of hog carcasses fed sequentially to the machine.

The machine generally indicated at 10 in the accompanying drawings is intended to be used for cleaning the heads of hog carcasses sequentially fed as indicated by the arrow "A" to an operating station at which the machine 10 is disposed. Such cleaning is effective for removing singed bristles, dried blood and other dirt from the hogs' heads after such carcasses have undergone singeing depilation. Three such hog carcasses are indicated at 12, 13 and 14, the carcass 13 being illustrated as being in the process of undergoing a cleaning treatment by the machine 10. In the arrangement of FIG. 1, the hog carcasses 12, 13 and 14 are illustrated as being removably hooked onto an overhead conveyor generally indicated at 15 for sequential and intermittent transport to and from the aforementioned operating station.

Referring now in greater detail to the machine 10, it will be noted that this machine comprises a carcass-treating unit generally indicated at 16 and, in the particular embodiment illustrated, the carcass-treating unit 16 includes a pair of axially spaced apart and rotatable brushes generally indicated at 17 and 18. These brushes 17 and 18 have opposed axially projecting bristles 19 for engagement sequentially with the heads of each of the hog carcasses fed to the machine 10. The brushes 17 and 18 are carried by radially outwardly diverging discs 22 and 23 respectively. The carcass-treating unit 16 also includes a centrally disposed brush 20 (FIG. 2) having radially outwardly extending bristles 21 and mounted on a hub member (not shown). The diverging discs 22 and 23 and the aforementioned hub member of the brush 20 are keyed on a generally horizontal shaft 26 journaled in upstanding plates 27 and 28. Rotational drive movement is provided to the shaft 26 by an electric motor 30 having a power supply cord 31 and an appropriate control switch (not shown). The motor 30 is secured by bolts 32 passing through brackets 33 and 34 to an elevator base plate 35 on which the aforementioned upstanding plates 27 and 28 are also mounted.

The elevator base plate 35 is secured at one end to an upstanding plate 40 and diagonal braces 41 and 42 interconnect the elevator base plate 35 and the upstanding plate 40 to ensure structural rigidity of the carcass-treating unit 16. A hook 43 (FIG. 2) is provided generally centrally near the lower edge of the plate 40 for a purpose which will be more fully understood as the description herein proceeds.

Figure 2:
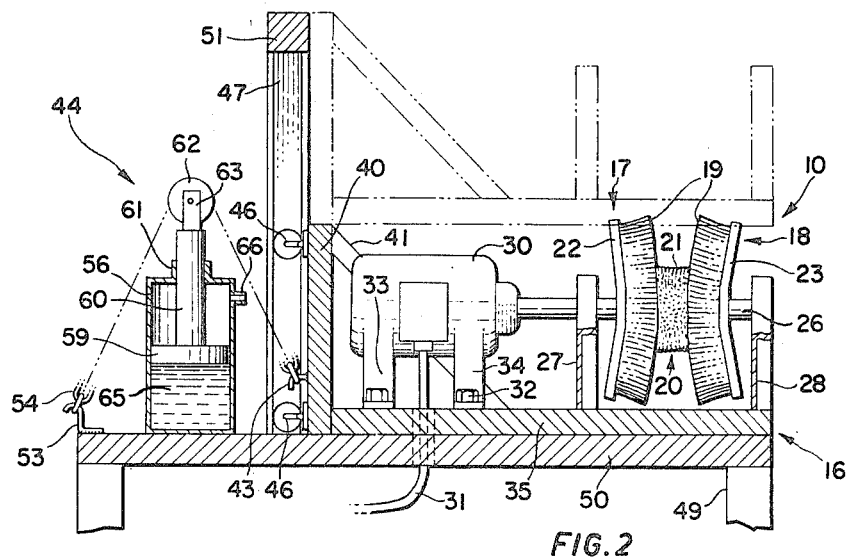
FIG. 2 is a fragmentary vertical section through the machine of FIG. 1 taken along the line 2—2 of that figure and showing in greater detail one form for the carcass-treating unit of the machine, the lowermost position of the carcass-treating unit being shown in solid lines and the uppermost position of that unit being shown in broken lines.

For a reason which will also become apparent as the description herein proceeds, the carcass-treating unit 16 is mounted on the machine 10 for movement thereon in a generally vertical direction as indicated by the arrow "B" in FIG. 1 between the positions shown in solid and broken lines in FIG. 2. For the purpose of controlling such vertical movement of the carcass-treating unit 16, the machine 10 also comprises a positioning means generally indicated at 44 while the aforementioned upstanding plate 40 has rotatably mounted on its side edges transversely projecting rollers 46 which are guided during such vertical movement within appropriate guideways provided for this purpose by upstanding side members 47 and 48 secured to a base from 50. In the particular machine 10 shown in the accompanying drawings, the base frame 50 is supported on legs 49 but the use of other supporting structures is equally possible. The upstanding members 47 and 48 are interconnected and braced at their upper ends by a cross member 51.

Referring now in greater detail to the positioning means 44, it will be noted that the particular embodiment of such means as illustrated includes a hydraulic cylinder 56 and a pneumatic vessel of air chamber 58. A piston including a piston head 59 is positioned within the hydraulic cylinder 56 and a piston rod 60 extends upwardly from the piston head 59 through a suitable guide 61. A pulley 62 rotatably mounted between brackets 63 provided on the upper end of the piston rod 60 supports a chain 54 extending from the aforementioned hook 43 on the plate 40 to a hook 53 provided at one end of the base frame 50.

Figure 3:
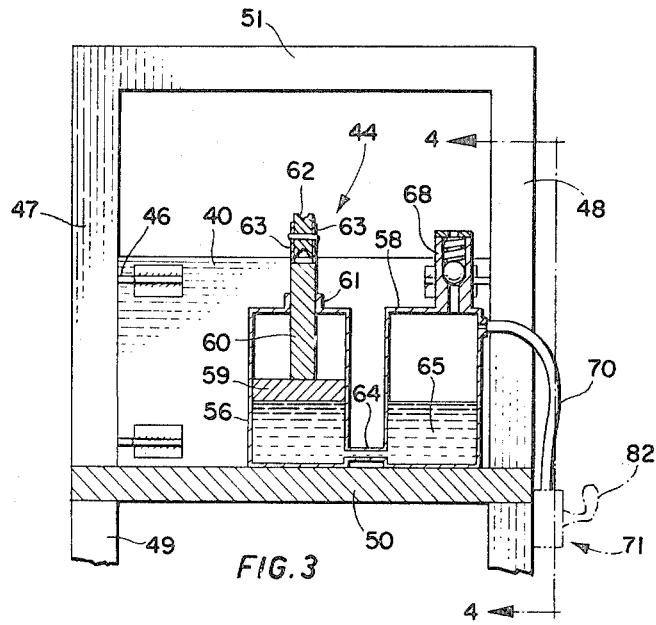
FIG. 3 is a fragmentary vertical section through the machine of FIGS. 1 and 2 taken as indicated by the arrows 3—3 of FIG. 1 and showing the positioning means provided in that machine for automatically and manually controlling the position of the carcass-treating unit of the machine.

An oil hose 64 extends between the lower end of the hydraulic cylinder 56 and the lower end of the pneumatic vessel or air chamber 58 so that hydraulic fluid indicated at 65 in FIGS. 2 and 3 can flow between the two vessels 56 and 58 in a manner yet to be explained to provide an upwardly directed hydraulic pressure on the piston head 59. A vent 66 is provided in proximity to the upper end of the hydraulic cylinder 56 to permit the free passage of air into and out of the hydraulic cylinder 56 upwardly of the piston head 59.

In accordance with a particularly useful feature of this invention, the air chamber 58 is provided with an air relief valve generally indicated at 68 and adapted to permit the escape of air from within the chamber 58 when the pressure within that chamber exceeds a predetermined value. Although the air relief valve 68 has been shown as being a simple ball valve, it will be appreciated that other types of valves can be used for the same purpose and, if desired, a valve with an adjustable operating release pressure could be used.

It will also be seen from the accompanying drawings that the positioning means 44 includes an air line or hose 70 extending from the upper end of the air chamber 58 to a valve block generally indicated at 71. An air supply line 72 is provided for supplying air at an elevated pressure to the valve block 71.

The valve block 71 includes a manually operable three-way air valve generally indicated at 73 and a unidirectional ball valve 74 for preventing the return flow of air into the air supply line 72. From FIG. 4, it will be seen that the three-way valve 73 comprises an inlet port 75 for receiving pressurized air from the ball valve 74, an air supply port 76 for the supply of pressurized air to the air hose 70 and a venting port 77. A valve body 78 of the three-way valve 73 includes a linear air passage 80 and a side passage 81. A control handle 82 is provided for manual rotation of the valve body 78 of the valve 73 in a manner which will be more readily understood when the operation of the machine 10 is hereinafter described in greater detail. It should perhaps also be explained that it is also possible to incorporate the aforementioned air relief valve 68 in the valve block 71 instead of on the air chamber 58.

The operation of the machine 10 will now be described in greater detail. In such operation, the electric motor 30 rotates the shaft 26 carrying the brushes 17, 18 and 20 while the overhead conveyor 15 is operated intermittently by means now shown to move each of the hog carcasses suspended from that conveyor 15 to the operating station for cleaning by engagement with the brushes 17, 18 and 20 as will readily be understood by reference to FIG. 1.

Since hog carcasses as exemplified by carcasses 12, 13 and 14 fed to the machine 10 will vary somewhat in length and in the thickness of their heads, the machine 10 operates so as automatically to adjust the position of the elevator base plate 35 on which the brushes 17, 18 and 20 are mounted in response to the reactive force exerted by each hog head on the brushes 17 18 and 20 of the machine 10.

Figure 4:
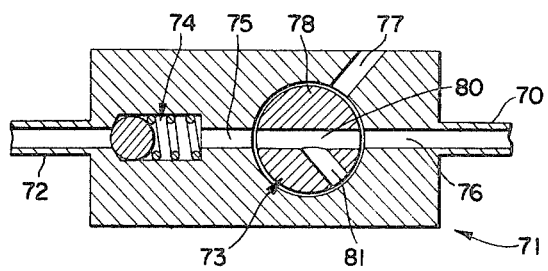
FIG. 4 is a fragmentary vertical section through the control valve of the machine of FIGS. 1 to 3 when viewed as indicated by the arrows 4—4 of FIG. 3.

For effecting such automatic operation of the machine 10, the control handle 82 of the aforementioned valve 73 is rotated into the position actually illustrated in FIG. 4. In such position, the valve 73 permits the free flow of compressed air at a suitable predetermined pressure from a source such as a compressor (not shown) through the unidirectional ball valve 74, the inlet port 75, the linear air passage 80, the air supply port 76 and the air hose 70 into the air chamber 58 above the hydraulic fluid 65 contained therein. The action of such pressurized air within the air chamber 58 is to drive hydraulic fluid 65 through the fluid hose 64 into the hydraulic cylinder 56 downwardly of the piston head 59 therein in turn to urge that piston head 59 to move upwardly. Any resulting upward movement of the piston head 59 is transmitted through the piston rod 60, the pulley 62 and the chain 54 to the elevator base plate 35 to move the latter and the brushes 17, 18 and 20 mounted thereon upwardly into operative engagement with the respective one of the hogs' heads 12, 13 and 14 disposed between the brushes 17 and 18. Such movement will continue until the force of the air pressure within the air chamber 58 is balanced by the reactive force of the particular hog head on the brushes 17, 18 and 20. Any variation in the force between a particular hog head and the brushes is automatically accommodated by movement of the piston head 59 in the hydraulic cylinder 56.

For example, in the event that the elevator base plate 35 is disposed in too high a position when an animal carcass is moved along the overhead conveyor 15 into position between the brushes 17 and 18, the elevator base plate 35 will be moved downwardly by the force of the carcass on the brushes so to compress the air above the hydraulic fluid 65 in the air chamber 58. During such compression, back flow of air from the chamber 58 into the air supply line 72 is prevented by the ball valve 74.

If the compression of the air within the air chamber 58 leads to an increase in the air pressure therewithin above a predetermined value, the air relief valve 68 automatically opens to permit the escape of air therefrom and the automatic transfer of further hydraulic fluid from the hydraulic cylinder 56 into the air chamber 58. This in turn leads automatically to further lowering of the carcass-treating unit 16 until the forces are again in equilibrium.

It will also be understood that with the valve 73 set for automatic operation as shown in FIG. 4, the carcass-treating unit 16 will be automatically moved to its highest position by the flow of air through the valve 73 between the treatment of successive hog carcasses and that, as each such carcass enters into the space between the bushes 17 and 18 of the carcass-treating unit 16, the latter will move downwardly to accommodate the size of each particular carcass. Such automatic response to carcass size is advantageous in maintaining a substantially constant speed for the motor shaft 26 so reducing the risk of damage to the electric motor 30 from overloading.

It will also be understood that by turning the control handle 82 so that the side valve passage 81 is aligned with the air supply port 76 of the valve block 71, air from within the air chamber 58 is directly vented through the venting port 77 of the valve block 71 to permit in turn rapid lowering of the carcass-treating unit 16 if and when required. Additionally, the valve body 78 may be rotated through ninety degrees from the position actually shown in FIG. 4 to disable the positioning means 44 of the machine 10.

Another important advantage resulting from the construction of the machine 10 as actually shown in the accompanying drawings is obtained by the use of a flexible linkage such as the chain 54 interconnecting the carcass-treating unit generally indicated at 16 and the positioning means generally indicated at 44. With such a flexible interconnection between the two units, the hydraulic cylinder 56 and its associated pistons are considerably isolated from any stresses exerted on the carcass-treating unit 16 as a result of its direct engagement with the several animal carcasses passing therethrough.

Although the invention has been described with specific reference to the particular embodiment of a machine in accordance therewith as actually shown in the accompanying drawings, it will be appreciated that numerous variations and modifications are possible without departing from the spirit of the invention.

What I claim is:

1. A machine for effecting a processing treatment on each of a series of animal carcasses sequentially fed to an operating station, which machine comprises:

a carcass-treating unit movably mounted at said operation station for movement between upper and lower positions and adapted sequentially to effect initial engagement with each of said animal carcasses when in said upper position for effecting a processing treatment sequentially thereon;

position control means permitting said unit to move downwardly relative to each said animal carcass disposed at said operating station a distance determined by the dimensional characteristics of each said animal carcass; and power operated means operatively associated with said position control means and adapted to urge said carcass-treating unit upwardly into said upper position and to maintain said carcass-treating unit in processing engagement with each said animal carcass at said operating station, and to return same to said upper position upon completion of said processing.

2. A machine as claimed in claim 1 which includes a guideway in which said carcass-treating unit is mounted for guided movement between said upper and lower positions.

3. A machine as claimed in claim 2 which additionally includes a flexible drive linkage interconnecting said position control means and said carcass-treating unit.

4. A machine as claimed in claim 2 in which said position control means is pneumatically operable by said power operated means to urge said carcass-treating unit to move upwardly in said guideway but permits movement of said carcass-treating unit downwardly in said guideway on engagement of said carcass-treating unit with each said animal carcass sequentially by the compression of a volume of pressurized air enclosed within said position control means in response to such engagement of said carcass-treating unit and each said animal carcass.

5. A machine as claimed in claim 4 in which said position control means additionally includes a pressure relief means adapted to permit the escape of air therefrom in turn to permit further movement of said carcass-treating unit downwardly in said guideway when said force exerted by each said animal carcass on said carcass-treating unit exceeds a predetermined value, and said power operated means includes a unidirectional air supply means for the introduction of pressurized air into said position control means when the air pressure therewith falls below a predetermined value.

6. A machine as claimed in claim 2 in which said guideway is disposed generally vertically for movement upwardly and downwardly therealong of said carcass-treating unit, in which said carcass-treating unit includes a pair of axially spaced-apart brushes mounted on said carcass-treating unit for rotational engagement sequentially with each head of a series of animal carcasses suspended above said machine for sequential feed thereto, in which said carcass-treating unit is adapted to be urged downwardly along said guideway by engagement of said brushes thereof sequentially with each said animal carcass head, in which said position control means includes a piston disposed within a cylinder and operatively connected to said carcass-treating unit, in which said cylinder is operatively associated with an air chamber, in which said power operated means includes a unidirectional air input means for the supply of pressurized air into said air chamber to urge said brushes upwardly into engagement sequentially with each said animal carcass head for brushing engagement therewith, in which said brushes are urged downwardly by engagement with each said animal carcass head to compress said air within said air chamber, and in which said position control means includes an air relief valve adapted to permit the escape of air from within said air chamber in turn to permit further downward movement of said brushes when said force exerted by each said animal carcass head on said carcass-treating unit exceeds a predetermined value.

7. A machine as claimed in claim 6 in which said cylinder is hydraulically actuated and contains a body of hydraulic liquid in pressure communication with said air contained within said air chamber.

8. A machine as claimed in claim 7 which additionally includes a manually operable control valve adapted to control the flow of said pressurized air into and out of said air chamber in turn to permit manual control of the vertical position of said brushes.

9. A machine as claimed in claim 8 in which said piston is connected to said carcass-treating unit through a flexible linkage.

* * * * *